United States Patent Office 2,862,854
Patented Dec. 2, 1958

2,862,854

PURIFICATION OF ACETIC ACID EMPLOYING HYDROXYLAMINE ACETATE AS PURIFYING AGENT

Alexander F. MacLean, Corpus Christi, Tex., assignor to Celanese Corporation of America, New York, N. Y., a corporation of Delaware No Drawing. Application February 1, 1956
Serial No. 562,661

1 Claim. (Cl. 202—39.5)

This invention relates to lower aliphatic acids and relates more particularly to the purification of acetic and propionic acids.

It has been found difficult to purify acetic and propionic acids produced by the liquid phase partial oxidation of hydrocarbons, such as n-butane and pentane, for example. Thus, when ordinary distillation methods are used in the purification of such acids, a small proportion, e. g. less than 0.1%, of highly reactive impurities remains in the acids and often unsatisfactory results are obtained when the "purified" acids are subjected to the usual tests for purity, i. e. to the sulfuric acid color tests and the permanganate reaction time test.

It is therefore an object of this invention to provide a new and efficient method for the purification of acetic acid and propionic acid produced by the partial oxidation of aliphatic hydrocarbons.

Other objects of this invention will be apparent from the following detailed description and claim. In this description and claim all proportions are by weight unless otherwise indicated.

In accordance with one aspect of this invention acetic acid or propionic acid made by the liquid phase oxidation of a lower aliphatic hydrocarbon is purified by passing vapors thereof upwardly through a downwardly flowing stream containing a hydroxylamine salt of a lower aliphatic acid, such as hydroxylamine acetate or hydroxylamine propionate. In general it is desirable to use the salt of the acid being purified. Thus, in one preferred embodiment, acetic acid vapors obtained by the partial purification, by distillation, of the crude acetic acid are introduced into the bottom of a distillation column while a solution of hydroxylamine acetate is fed in at the top of the column, the resulting purified acetic acid vapors being drawn off from the top without reflux.

In the practice of this invention it is desirable that the amount of hydroxylamine salt fed to the distillation column be in the range of 0.01 to 1%, based on the amount of acetic acid fed to the column. The hydroxylamine salt is advantageously supplied in the form of a solution thereof in the acetic or propionic acid; for example as a solution of 10% concentration.

The temperature at which the process of this invention is carried out is generally about the boiling point of the acetic or propionic acid being purified. Thus, when operating at atmospheric pressure, which is preferred, the temperature will be about 120 to 140° C. At superatmospheric and subatmospheric pressures the treatment temperatures will be higher and lower, respectively.

The following example is given to illustrate this invention further.

*Example*

Acetic acid is produced by liquid phase partial oxidation of n-butane by passing air or other source of molecular oxygen through an acetic acid solution of said butane containing a cobalt salt as a catalyst. The resulting crude acid is passed through a series of distillation columns to produce a stream of vapors of acetic acid containing less than 0.1% of harmful impurities, together with traces of water and propionic acid, and these vapors are entered into the bottom of another distillation column having 20 plates and operating with no reflux and at atmospheric pressure, while a stream of a 10% solution of hydroxylamine acetate in substantially anhydrous acetic acid is fed into the top of this distillation column at a rate by weight, equal to $1/100$ of the rate at which the acetic acid vapors are fed into the bottom of the column. The vapors leaving the top of this last column are condensed to form liquid acetic acid of high purity, having a permanganate time of more than two hours and a sulfuric acid transmission of 100%. In contrast, the acetic acid entering at the bottom of this last column has a permanganate time of less than 5 seconds and a sulfuric acid color of 94%.

It is to be understood that the foregoing detailed description is given merely by way of illustration and that many variations may be made therein without departing from the spirit of my invention.

Having described my invention what I desire to secure by Letters Patent is:

Process for the treatment of acetic acid, which comprises continuously distilling acetic acid obtained by partial oxidation, with molecular oxygen, of a lower aliphatic hydrocarbon, to produce partially purified vapors of said acetic acid, feeding a stream of said vapors, containing at most 0.1% of harmful impurities, into the bottom of a distillation column, feeding a liquid stream of a solution of hydroxylamine acetate in acetic acid into the top of said column, and recovering and condensing vapors of purified acetic acid from the top of said column, the amount of hydroxylamine acetate fed to said column being in the range of 0.01 to 1% based on the amount of acetic acid fed to said column.

References Cited in the file of this patent

UNITED STATES PATENTS

| | | |
|---|---|---|
| 2,126,611 | Britton | Aug. 9, 1938 |
| 2,384,374 | Harrison | Sept. 4, 1945 |
| 2,631,970 | Barnes | Mar. 17, 1953 |

OTHER REFERENCES

Technique of Organic Chemistry, vol. IV (Weissberger, Ed.), "Distillation," published by Interscience Publishers, Inc. (N. Y.) 1951.